US008773967B2

(12) United States Patent
Jung et al.

(10) Patent No.: US 8,773,967 B2
(45) Date of Patent: Jul. 8, 2014

(54) METHOD AND SYSTEM FOR TRANSMITTING SIGNALS BETWEEN A FIRST SIGNAL SOURCE AND A SECOND SIGNAL SOURCE

(75) Inventors: Peter Jung, Otterberg (DE); Guido Bruck, Voerde (DE); Andreas Waadt, Duisburg (DE); Alexander Viessmann, Duisburg (DE)

(73) Assignee: Universitaet Duisburg-Essen, Essen (DE)

(*) Notice: Subject to any disclaimer, the term of this patent is extended or adjusted under 35 U.S.C. 154(b) by 93 days.

(21) Appl. No.: 13/426,639

(22) Filed: Mar. 22, 2012

(65) Prior Publication Data

US 2012/0201189 A1 Aug. 9, 2012

Related U.S. Application Data

(63) Continuation of application No. PCT/EP2009/006910, filed on Sep. 24, 2009.

(51) Int. Cl.
*H04J 9/00* (2006.01)
*H04B 7/155* (2006.01)

(52) U.S. Cl.
CPC ................. *H04B 7/15521* (2013.01)
USPC .......................................... 370/204; 370/334

(58) Field of Classification Search
CPC ............ H04B 7/026; H04B 7/15592; H04B 7/15521; H04B 7/15; H04W 84/047
USPC ......... 370/203–211, 226, 315, 319, 326, 343, 370/344, 492, 501
See application file for complete search history.

(56) References Cited

U.S. PATENT DOCUMENTS

| | | | |
|---|---|---|---|
| 7,720,020 B2 * | 5/2010 | Larsson ........................ | 370/315 |
| 2006/0034390 A1 * | 2/2006 | Vummintala et al. ......... | 375/299 |
| 2007/0230605 A1 * | 10/2007 | Osseiran et al. ............... | 375/260 |
| 2007/0280333 A1 * | 12/2007 | Abou Rjeily ................. | 375/130 |
| 2008/0013520 A1 * | 1/2008 | Liu et al. ....................... | 370/347 |
| 2008/0062909 A1 * | 3/2008 | Shin et al. ..................... | 370/315 |
| 2008/0175184 A1 * | 7/2008 | Chindapol et al. ............ | 370/315 |
| 2008/0279135 A1 * | 11/2008 | Periyalwar et al. ........... | 370/315 |
| 2008/0298474 A1 * | 12/2008 | Charbit et al. ................ | 375/241 |

(Continued)

FOREIGN PATENT DOCUMENTS

WO    WO 2006/023587 A2    3/2006
WO    WO 2009/026695 A1    3/2009

OTHER PUBLICATIONS

Fitzek et al., "Cooperation in wireless networks: Principles and Applications", 2006, Springer, Chapter 2, pp. 29-45.*

(Continued)

*Primary Examiner* — Paul H. Masur
*Assistant Examiner* — Michael Phillips
(74) *Attorney, Agent, or Firm* — Norman B. Thot

(57) ABSTRACT

A relay station and a method for relaying signals between a first signal source and a second signal source. The relay station includes at least two antennas for receiving/transmitting signals from/to the first and second signal sources. At the relay station first and second signals received from the first and second signal sources are network coded thereby generating a first network coded signal and a second network coded signal. The first and second network coded signals are transmitted from the relay station to the first and second signal sources using different antennas.

6 Claims, 5 Drawing Sheets

(56) References Cited

U.S. PATENT DOCUMENTS

| | | | | |
|---|---|---|---|---|
| 2008/0317104 | A1* | 12/2008 | Akcaba et al. | 375/211 |
| 2009/0060012 | A1* | 3/2009 | Gresset et al. | 375/219 |
| 2009/0067533 | A1* | 3/2009 | Yuan et al. | 375/267 |
| 2009/0093266 | A1* | 4/2009 | Taori et al. | 455/509 |
| 2009/0103428 | A1* | 4/2009 | Kim et al. | 370/210 |
| 2009/0129496 | A1* | 5/2009 | Zhang et al. | 375/262 |
| 2009/0196214 | A1* | 8/2009 | Li et al. | 370/315 |
| 2009/0201889 | A1* | 8/2009 | Sundaresan et al. | 370/336 |
| 2010/0067362 | A1* | 3/2010 | Sakaguchi et al. | 370/203 |
| 2010/0173659 | A1* | 7/2010 | Shin et al. | 455/500 |
| 2010/0261426 | A1* | 10/2010 | Shin et al. | 455/9 |
| 2010/0278169 | A1* | 11/2010 | Wang et al. | 370/345 |
| 2010/0316097 | A1* | 12/2010 | Wang et al. | 375/211 |
| 2010/0316165 | A1* | 12/2010 | Lee et al. | 375/308 |
| 2011/0149835 | A1* | 6/2011 | Shimada et al. | 370/315 |

OTHER PUBLICATIONS

Tse, et al., "Fundamentals of Wireless Communication", 2005, Cambridge University Press, Cover Sheet.*
Jan C A van der Lubbe, "Information Theory", 1997, Cambridge University Press, Chapter 1, pp. 1-38.*
K. Lee et al.: "MIMO-Assisted Hard Versus Soft Decoding-and-Forwarding for Network Coding Aided Relaying Systems", IEEE Transactions on Wireless Communications, IEEE Service Center, vol. 8, No. 1, pp. 376-385 (Jan. 2009).
S. M. Alamouti: "A Simple Transmit Diversity Technique for Wireless Communications", IEEE Journal on Select Areas in Communications, vol. 16, No. 8, pp. 1451-1458 (Oct. 1998).
R. Ahlswede et al.: "Network Information Flow", IEEE Transactions on Information Theory, vol. 46, No. 4, pp. 1204-1216 (Jul. 2000).
S. Zhang et al.: "Physical-Layer Network Coding", Proceedings of the 12$^{th}$ Annual International Conference on Mobile Computing and Networking, MobiCom'06, pp. 358-365 (2006).
S. Katti et al.: "Embracing Wireless Interference: Analog Network Coding", Proceedings of the Special Interest Group on Data Communication Conference, SIGCOMM'07, pp. 397-408 (Aug. 27-31, 2007).
S. Fu et al.: "Cooperative Network Coding for Wireless Ad-Hoc Networks", Proceedings of the IEEE GLOBECOM 2007, pp. 812-816 (2007).
E. Fasolo et al.: "Network Coding meets MIMO", Network Coding Theory and Applications, NetCod 2008, Fourth Workshop, pp. 1-6 (Jan. 3-4, 2008).
M. Kiessling et al.: "Analytical Performance of MIMO Zero-Forcing Receivers in correlated Rayleigh Fading Environments", 4$^{th}$ IEEE Workshop on Signal Processing Advances in Wireless Communications, pp. 383-387 (2003).
H. Zhang et al.: "Capacity and Error Probability Analysis for Orthogonal Space-Time Block Codes Over Fading Channels", IEEE Transactions on Wireless Communication, vol. 4, No. 2, pp. 808-819 (Mar. 2005).
W. Shieh et al.: "Coherent optical OFDM: theory and design", Optics Express, vol. 16, No. 2, pp. 841-859 (Jan. 2008).
M. Mayrock et al.: "Impact of Implementation Impairments on the Performance of an Optical OFDM Transmission System", Proceedings of 32$^{nd}$ European Conference on Optical Communications, pp. 1-2 (Sep. 2006).
A. Ali et al.: "Spectral Efficiency and Receiver Sensitivity in Direct Detection Optical-OFDM", OFC, paper OMT7, pp. 1-3 (Mar. 22-26, 2009).
F. H. P. Fitzek et al.: "Cooperation in wireless networks: Principles and applications", Chapter 2, pp. 29-68, Springer (2006).
D. Tse et al.: "Fundamentals of Wireless Communications", Cambridge University Press (2005)—Only Cover sheet with title provided.
J. C. A. Van Der Lubbe: "Information Theory", Cambridge University Press, Chapter 1, pp. 1-38 (1997).

* cited by examiner

METHOD AND SYSTEM FOR TRANSMITTING SIGNALS BETWEEN A FIRST SIGNAL SOURCE AND A SECOND SIGNAL SOURCE

CROSS-REFERENCE TO RELATED APPLICATIONS

This application is a continuation of copending International Application No. PCT/EP2009/006910, filed Sep. 24, 2009, which is incorporated herein by reference in its entirety.

The present invention is directed to the field of signal communication in a wireless network, especially the field of mobile communication systems. More specifically, the present invention relates to a method and a relay station for relaying signals between a first signal source and a second signal source, a method and a system for transmitting signals between a first signal source and a second signal source, and to a method and a signal source for receiving at the signal source a plurality of signals from a remote signal source.

BACKGROUND OF TILE INVENTION

Network coding (see e.g. Ahlswede, R.; Cai, N.; Li, S.-Y. R.; Yeung, R. W.-H. (2000). Network information flow. IEEE Transactions on Information Theory, 46 (2000), pp. 1204-1216) is a data distribution approach based on store, code and forward. The core notion is to allow and encourage mixing of data at intermediate network nodes. It helps to exploit the potential of the broadcasting nature of wireless radio in improving throughput of wireless communication systems.

Recently, wireless cooperative networks (see e.g. Fitzek, F. H. P.; Katz, M. D. (Eds.): Cooperation in wireless networks: Principles and applications. Berlin: Springer, 2006) comprising a transmission relay have attracted attention because of the potential improvement of the system capacity and throughput. Different technologies like traditional signal forwarding, PHY layer (PHY=physical) constellation adding and network coding have been deployed in such networks as is described e.g. by Ahlswede, R.; Cal, N.; Li, S.-Y. R.; Yeung, R. W.-H. (2000). Network information flow. IEEE Transactions on Information Theory, 46 (2000), pp. 1204-1216, Zhang, S.; Liew, S.; Lam, P.: Hot topic: Physical layer network coding. In Proceedings of the 12th Annual International Conference on Mobile Computing and Networking (MobiCom'06), 2006, pp. 358-365, Katti, S.; Gollakota, S.; Katabi, D,: Embracing wireless interference: Analog network coding. Proceedings of the Special Interest Group on Data Communication Conference (SIGCOMM'07), Aug. 27-31, 2007, Kyoto, Japan, pp. 397-408, Shengli Fu; Kejie Lu; Yi Qian; Varanasi, M.: Cooperative network coding for wireless ad-hoc networks. Proceedings of the IEEE GLOBECOM 2007, pp. 812-816, Spatial diversity is e.g. described by Tse, D.; Viswanath, P.: Fundamentals of wireless communications. New York: Cambridge University Press, 2005.

Although network coding in wireless networks may benefit from broadcasting, it also faces the challenge of channel fading. The MIMO (MIMO=multiple input multiple output) technology may improve the performance in fading environments by means of spatial diversity (see e.g. Fasolo, E.; Rossetto, F.; Zorzi, M.; Network Coding meets MIMO, Network Coding, Theory and Applications, 2008. NetCod 2008. Fourth Workshop on 3-4 Jan. 2008 pp. 1-6). The Alamouti scheme (see Alamouti, S. M.: A simple transmit diversity technique for wireless communication. IEEE Journal on Select Areas in Communications, vol. 16 (1998), pp. 1451-1458), for instance, may achieve full diversity with STBC (Space Time Block Coding). MIMO systems may also increase the data rate by using a spatial multiplexing scheme.

Some research on improving the performance of a two-step relay network exists. For example, the main idea of PHY layer network coding (see e.g. Zhang, S,; Liew, S.; Lam, P.: Hot topic: Physical layer network coding. In Proceedings of the 12th Annual International Conference on Mobile Computing and Networking (MobiCom'06), 2006, pp. 358-365) is network coding at the physical layer that deals with signal reception and modulation. It doubles the throughput of a canonical 2-way network, but involves strict conditions in symbol-phase synchronization and carrier-frequency synchronization. Katti, S.; Gollakota, S.; Katabi, D.: Embracing wireless interference: Analog network coding. Proceedings of the Special Interest Group on Data Communication Conference (SIGCOMM'07), Aug. 27-31, 2007, Kyoto, Japan, pp. 397-408 describe an improvement dealing with these synchronization constraints by estimating the wireless channels from two none aligned signals of two senders.

SUMMARY

According to an embodiment, a method for relaying signals between a first signal source and a second signal by a relay station that includes at least two antennas for receiving/transmitting signals from/to the first and second signal sources may have the steps of: in a first time slot, receiving at the relay station a first signal from the first source and a first signal from the second source; in a second time slot, receiving at the relay station a second signal from the first source and a second signal from the second source; at the relay station, generating a first network coded signal by network coding the first signals received from the first and second signal sources in the first time slot, and generating a second network coded signal by network coding the second signals received from the first and second signal sources in the second time slot; in a third time slot, transmitting the first network coded signal by a first antenna of the relay station, and transmitting the second network coded signal by a second antenna of the relay station; and in a fourth time slot, transmitting the first network coded signal by the second antenna of the relay server, and transmitting the second network coded signal by the first antenna of the relay server.

Another embodiment may have a computer readable medium including a plurality of instructions for carrying out a method of claim 1, wherein executing the instructions by a computer.

According to another embodiment, a relay station for relaying signals between a first signal source and a second signal source may have: at least two antennas for receiving/transmitting signals; and a processor is configured to cause network coding of signals received, the relay station being configured to cause: in a first time slot, receiving at the relay station a first signal from the first source and a first signal from the second source; in a second time slot, receiving at the relay station a second signal from the first source and a second signal from the second source; at the relay station, generating a first network coded signal by network coding the first signals received from the first and second signal sources in the first time slot, and generating a second network coded signal by network coding the second signals received from the first and second signal sources in the second time slot; in a third time slot, transmitting the first network coded signal by a first antenna of the relay station, and transmitting the second network coded signal by a second antenna of the relay station; and in a fourth time slot, transmitting the first network coded signal by the second antenna of the relay server, and transmitting the second network coded signal by the first antenna of the relay server.

According to another embodiment, a system may have: a first signal source; a second signal source; and a relay station for relaying signals between a first signal source and a second signal source, including: at least two antennas for receiving/transmitting signals; and a processor is configured to cause network coding of signals received, the relay station being configured to cause: in a first time slot, receiving at the relay station a first signal from the first source and a first signal from the second source; in a second time slot, receiving at the relay station a second signal from the first source and a second signal from the second source; at the relay station, generating a first network coded signal by network coding the first signals received from the first and second signal sources in the first time slot, and generating a second network coded signal by network coding the second signals received from the first and second signal sources in the second time slot; in a third time slot, transmitting the first network coded signal by a first antenna of the relay station, and transmitting the second network coded signal by a second antenna of the relay station; and in a fourth time slot, transmitting the first network coded signal by the second antenna of the relay server, and transmitting the second network coded signal by the first antenna of the relay server; wherein the respective signal sources are configured to cause transmitting from the first signal source consecutively a first signal and a second signal, and from the second signal source consecutively a first signal and a second signal, and determine the first and second signals that originated from the other of the first and second signal sources on the basis of the first and second network coded signals received at the signal source and on the basis of the first and second signals of the signal source.

Embodiments of the invention provide a new two-step communication protocol combined with MIMO (Multiple Input Multiple Output) technologies, which allows improving the system throughput in cooperative networks. The protocol is termed MINEC (MEMO Network Coding). In accordance with an embodiment, a three nodes network with multi-antennas on a relay node is described as an illustrative example of MINEC. In step one of MINEC, the two source nodes transmit messages simultaneously; in step two, the relay node broadcasts coded data with network and space-time coding. A binary symmetric relay channel model may be used to carry out the theoretical performance analysis of MINEC. The theoretical findings are validated by Monte-Carlo-simulations. It is found that MINEC facilitates a performance equivalent to a 2×2 V-BLAST MIMO and a two 2×1 Alamouti MIMO in transmitting phase and forwarding phase, respectively Approaches in conventional technology (e.g. the ones described by Zhang, S.; Liew, S.; Lam, P.: Hot topic: Physical layer network coding. In Proceedings of the 12th Annual International Conference on Mobile Computing and Networking (MobiCom'06), 2006, pp. 358-365, or Kati, S.; Gollakota, S.; Katabi, D.: Embracing wireless interference: Analog network coding. Proceedings of the Special Interest Group on Data Communication Conference (SIG-COMM'07), Aug. 27-31, 2007, Kyoto, Japan, pp. 397-408) did not consider the fading channel effects or MIMO. It is an advantage of the inventive approach that the combination of network coding and MIMO based on the inventive two-step protocol will improve the network coding for a fading channel. By combining network coding and MIMO technology into a relay network, a throughput improvement from network coding as well as spatial multiplexing, and a more reliable transmission from spatial diversity is achieved.

BRIEF DESCRIPTION OF THE DRAWINGS

Embodiments of the present invention will be detailed subsequently referring to the appended drawings, in which.

DETAILED DESCRIPTION OF THE INVENTION

Figure 1:
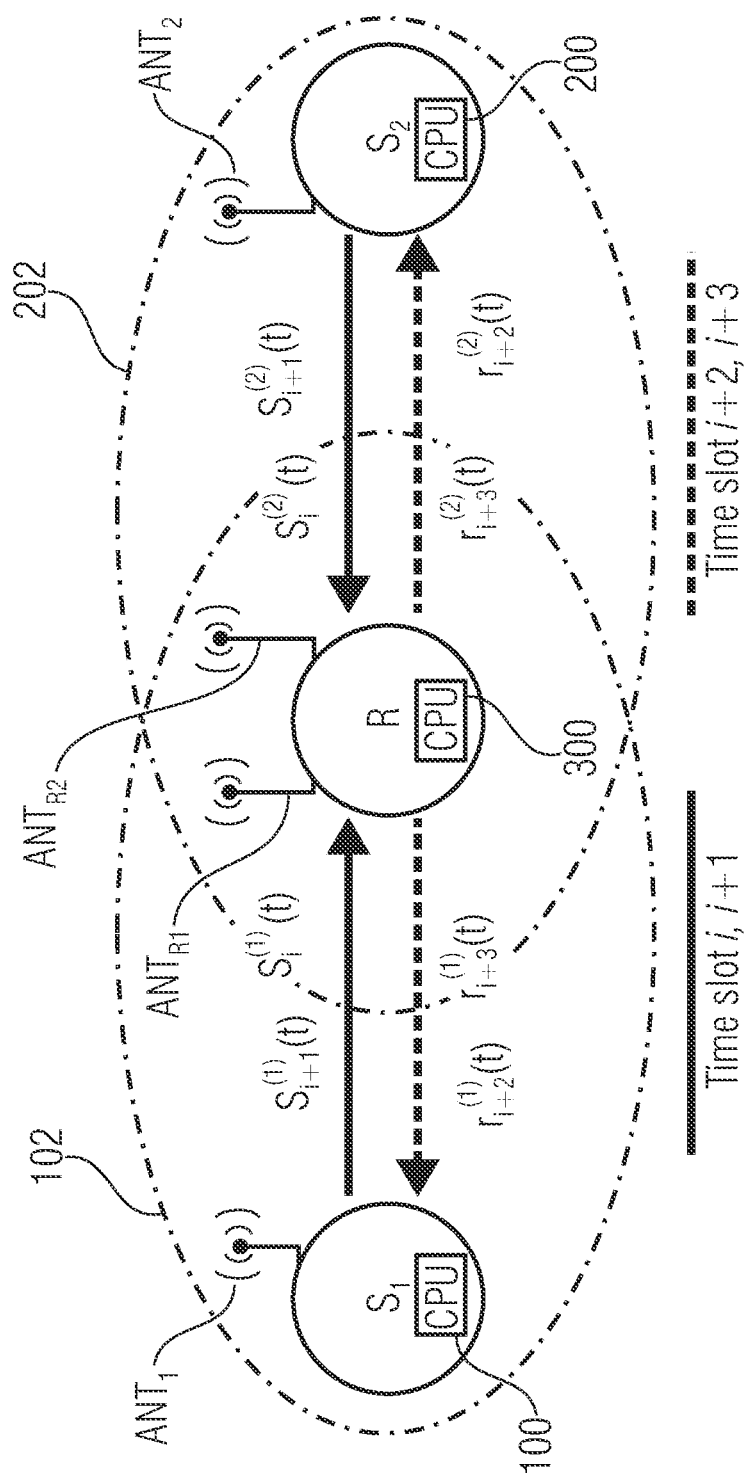
FIG. 1 shows a three nodes relay network with two step transmission according to an embodiment of the invention.

Subsequently advantageous embodiments of the inventive approach of providing a novel two-step communication protocol will be described on the basis of a three-nodes relay network as it is shown in FIG. 1. It is noted that the present invention, naturally, is not limited to such a three-nodes relay network as shown in FIG. 1, rather, the inventive approach, namely the new two-step communication protocol described subsequently in further detail, can be applied to any network in which a plurality of messages or signals are to be exchanged between a plurality of signal nodes which cannot directly communicate with each other, but communicate via a relay station. In addition, the network itself may comprise a plurality of relay nodes or relay stations and a plurality of signal nodes or signal sources communicating with each other, and in case such communication takes place via a relay node, the inventive two-step communication protocol may be used in a manner as described below.

FIG. 1 shows an example of a three-nodes relay network comprising a first signal node $S_1$. It is noted that FIG. 1 is a schematic representation of the network and the signal node $S_1$ comprises an antenna $ANT_1$ and a signal processing unit 100. The network further comprises a second signal node $S_2$ comprising an antenna $ANT_2$ and a central processing unit 200. Further, the network comprises a relay node R. The relay node R comprises a first antenna $ANT_{R1}$ and a second antenna $ANT_{R2}$. Further, the relay node R comprises a central processing unit or data processing unit 300.

The first signal node $S_1$ when sending towards the relay node R has a range that is shown by the dashed dotted line 102. The second signal source $S_2$ when transmitting towards the relay node R has a range as shown by the dashed dotted line 202. While the ranges of the signal nodes $S_1$ and $S_2$ overlap in the area where the relay node is provided, the second signal source $S_2$ is out of range of the first signal node $S_1$ and vice versa. Therefore, communication between the signal nodes $S_1$ and $S_2$ is done via the relay node R. Solid line arrows indicate a communication from the first and second signal nodes $S_1$ and $S_2$ towards the relay node during a first and a second time slot, more specifically during two consecutive time slots i, i+1. The dashed arrows indicate the communication from the relay node R to the signal nodes $S_1$ and $S_2$ at a third and a fourth time, for example, during time slots i+2 and i+3.

Figure 2:
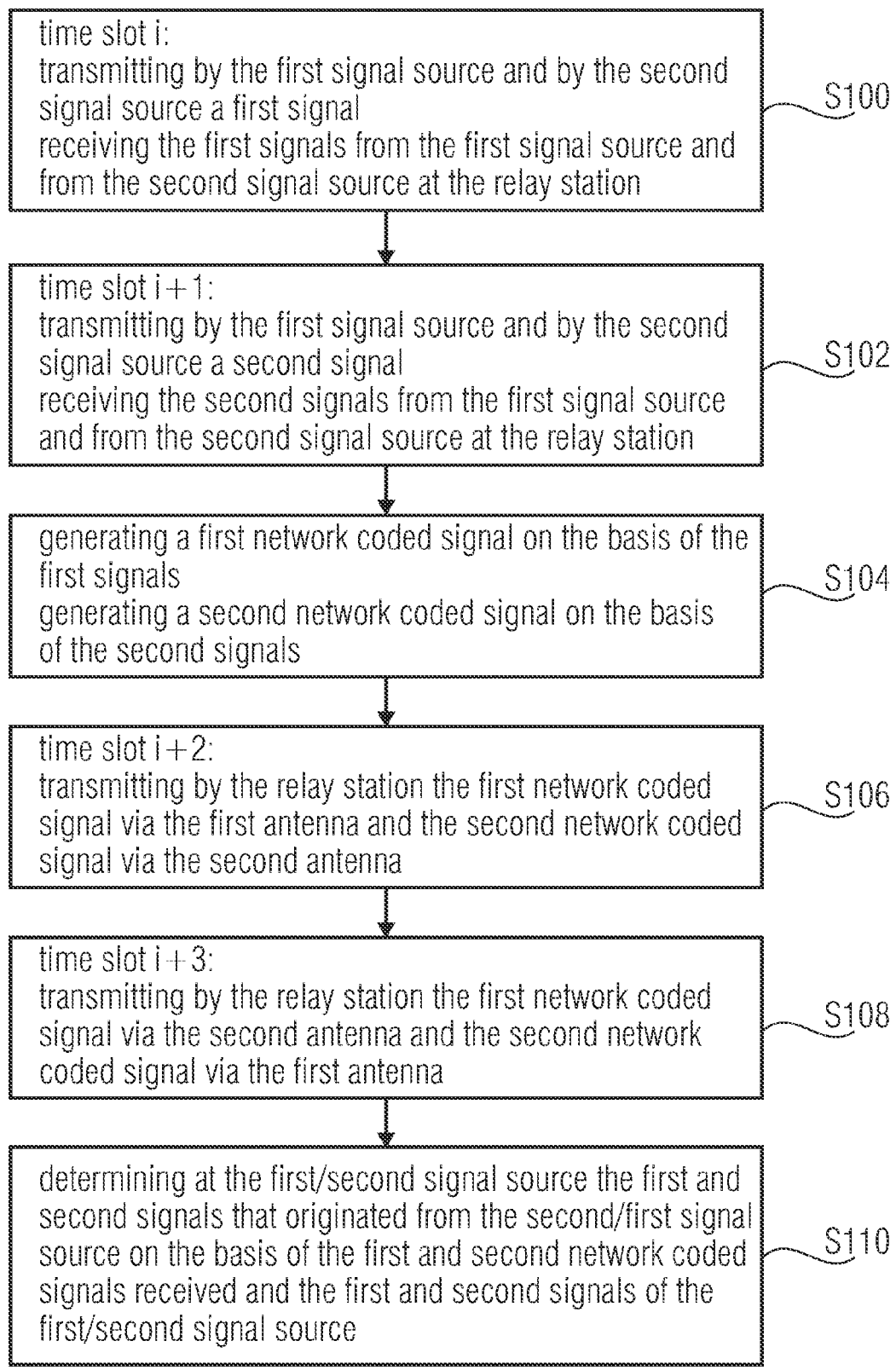
FIG. 2 shows a flow diagram illustrating a method according to an embodiment of the invention for transmitting signals between to signal nodes in the three nodes relay network of FIG. 1.

In the following, an embodiment of the invention using the two-step communication protocol will be described with respect to FIG. 2 in further detail. FIG. 2 is a flow diagram on the basis of which the inventive system and the functionality thereof will be described, and for the description it is assumed that the transmission starts at a first time slot i at step S100. In time slot i the first signal node or signal force $S_1$ and also the second signal source or second signal node $S_2$ transmits a first signal $S_i$ to the relay station R, as is indicated by the solid line arrows in FIG. 1. These signals are received at the relay station or relay node R.

In a following time slot i+1, second signals $s_{i+1}$ are transmitted from the signal nodes $S_1$ and $S_2$ to the relay node R as is indicated again by the solid line arrows in FIG. 1 and as is shown in step S102 of FIG. 2. These signals are received at the relay node and at step S104. At the CPU 300 of the relay node R the signals received from the signal nodes $S_1$ and $S_2$ during the consecutive time slots i and i+1 are network coded, more specifically, a first network coded signal is generated on the basis of the first signals received from the signal nodes $S_1$ and $S_2$, and a second network coded signal is generated on the basis of the second signals received at the relay node R, as shall be described in further detail below.

After completing the generation of the network coded signal, at a time slot i+2 the relay station R transmits the first and second network coded signals, as is shown at step S106. More specifically, the relay node R transmits the first network coded signal via its first antenna $ANT_{R1}$ and the second network coded signal via its second antenna $ANT_{R2}$. These signals are received at the signal nodes $S_1$ and $S_2$. In a following time slot, advantageously in time slot i+3, as is shown at step S108, the relay node R transmits again the first and second coded signals, however, in this time slot the relay node transmits the first network coded signal via its second antenna $ANT_{R2}$ and the second network coded signal via its first antenna $ANT_{R1}$. Again, the transmitted network coded signals are received by the signal nodes $S_1$ and $S_2$.

At step S110, at the first and second signal nodes $S_1$ and $S_2$ the respective signals that originated from the other signal source are determined on the basis of the received first and second network coded signals and on the basis of the first and second signals that were originally sent out from the respective signal node to the relay station R.

As mentioned above, while FIGS. 1 and 2 and also the subsequent description of the advantageous embodiments relate to networks including only two signal nodes and one relay node, the present invention is not limited to such networks, rather various network configurations can be employed and the network may comprise a plurality of relay nodes and more than two signal nodes. Also, a relay node may comprise more than two antennas, thereby allowing expanding the two-step communication protocol in accordance with the teachings of the present invention to a communication between more than two signal nodes within a network that uses the relay nodes for communicating with each other.

In the following, further details of the inventive two-step communication protocol will be described on the basis of the network shown in FIG. 1. In the canonical 2-way network of FIG. 1 the source nodes $S_1$ and $S_2$ are out of each other's communication range and have messages to exchange. They communicate through the relay node R that is within the range of both source nodes $S_1$ and $S_2$. It is assumed that the transmission is organized in consecutive time slots enumerated by i, $i \in \mathbb{Z}$. The source nodes $S_1$ and $S_2$ each comprise a single transceiver antenna $ANT_1$ and $ANT_2$. Other than a conventional system, the inventive system comprises a relay node R having two transceiver antennas $ANT_{R1}$ and $ANT_{R2}$, instead of having only a single transceiver antenna. Since the signals originating at source nodes $S_1$ and $S_2$ are mutually independent from each other and are locally displaced, and since the relay node R has the two transceiver antennas $ANT_{R1}$ and $ANT_{R2}$, the system may be seen as a 2×2 spatial multiplexing MIMO system. In the case of the relay node R transmitting and the source nodes $S_1$ and $S_2$ receiving information, the system may be viewed as a two 2×1 MISO systems. Thus, the relay network of FIG. 1 benefits from a virtual MIMO concept, exploiting the simultaneous operation of all antennas of all nodes.

In accordance with an embodiment of the invention a benefit from the network coding capabilities combined with MIMO is obtained by a two-step protocol for the MIMO relay system shown in FIG. 1. The protocol is termed MINEC (MIMO Network Coding). The mathematical description which will be given in what follows refers to the base band model of the transmission system.

MINEC Step One. Signal Node Transmitting

In the first MINEC step, the source nodes $S_1$ and $S_2$ in FIG. 1 transmit data simultaneously. The signal transmitted by the source node $S_1$ in the i-th time slot is denoted by $s_i^{(1)}(t)$ and the signal transmitted by the source node $S_2$ in the (i+1)-th time slot is denoted by $s_{i+1}^{(1)}(t)$. Similarly, the signals transmitted by the source node $S_2$ in the i-th and the (i+1)-th time slots are denoted by $s_i^{(2)}(t)$ and $s_{i+1}^{(2)}(t)$, respectively. The transmit signals $s_i^{(1)}(t)$, $s_{i+1}^{(1)}(t)$, $s_i^{(2)}(t)$ and $s_{i+1}^{(2)}(t)$ are binary phase shift keying (BPSK) modulated signals, each comprising N bits which are transmitted consecutively assuming a single carrier transmission. $E_b$ denotes the bit energy and $T_b$ is the bit duration. The data vector representing the data sequence transmitted by the source node $S_1$ in the time slot i is $$b_i^{(1)} = (b_{i,1}^{(1)}, \ldots, b_{1,N}^{(1)})^T \qquad (1)$$

wherein $$b_{i,n}^{(1)} \in \{-1, +1\}, n \in \{1, \ldots, N\} \qquad (2)$$

and, correspondingly, $b_i^{(2)}$ denotes the data vector at source node $S_2$ in the same time slot i. The transmit signals are hence given by $$s_i^{(1)}(t) = \sum_{n=1}^{N} b_{i,n}^{(1)} \cdot p(t - [n-1]T_b), \qquad (3)$$

$$s_i^{(2)}(t) = \sum_{n=1}^{N} b_{i,n}^{(2)} \cdot p(t - [n-1]T_b),$$

in the time slot i when using the BPSK impulse $$p(t) = \sqrt{\frac{2E_b}{T_b}} \begin{cases} 1 & \text{for } 0 \le t < T_b, \\ 0 & \text{else.} \end{cases} \qquad (4)$$

The relay node R receives these signals via its two transceiver antennas $ANT_{R1}$ and $ANT_{R2}$, $h_i^{(1,1)}(t)$ denotes the channel impulse response between the first source node $S_1$ and the first antenna $ANT_{R1}$ of the relay node R in the time slot i. $h_i^{(1,2)}(t)$ denotes the channel impulse response between the first source node $S_1$ and the second antenna $ANT_{R2}$ of the relay node R in the time slot i. Similarly, $h_i^{(2,1)}(t)$ and $h_i^{(2,2)}(t)$ represent the channel impulse responses between the second source node $S_2$ and the first antenna $ANT_{R1}$ and the second antenna $ANT_{R2}$ of the relay node R.

The system, which applies the inventive combination of network coding and MIMO, may be based on ad-hoc principles within a short range scenario with low transmit powers, exhibiting low mobility. In this case, the channel impulse responses approximately represent single path channels with negligible time variance; rather, inter-time slot time variations can occur. Hence, the general complex-valued numbers $h_i^{(1,1)}$, $h_i^{(1,2)}$, $h_i^{(2,1)}$, and $h_i^{(2,2)}$ can be used to represent the channel impulse responses. When carrying out the performance analysis (see below) it will be taken into account that $h_i^{(1,1)}$, $h_i^{(1,2)}$, $h_i^{(2,1)}$, and $h_i^{(2,2)}$ represent i.i.d. Rayleigh-flat-fading channels with a variance $\sigma^2$ equal to 1.

With the additive white Gaussian noise signals $n_i^{(1)}(t)$ and $n_i^{(2)}(t)$ at the first antenna $ANT_{R1}$ and the second antenna $ANT_{R2}$ of the relay node R in the time slot i and each having double-sided spectral noise power density $N_0/2$, and with $e_{R,i}^{(1)}(t)$ and $e_{R,i}^{(2)}(t)$ being the received signals at the first antenna $ANT_{R1}$ and the second antenna $ANT_{R2}$ of the relay node R in the time slot i, the communication system is given by the following set of equations:

$$\begin{pmatrix} e_{R,i}^{(1)}(t) \\ e_{R,i}^{(2)}(t) \end{pmatrix} = \begin{pmatrix} h_i^{(1,1)} & h_i^{(2,1)} \\ h_i^{(1,2)} & h_i^{(2,2)} \end{pmatrix} \begin{pmatrix} s_i^{(1)}(t) \\ s_i^{(2)}(t) \end{pmatrix} + \begin{pmatrix} n_i^{(1)}(t) \\ n_i^{(2)}(t) \end{pmatrix}. \tag{5}$$

The relay node R determines the information contained in the received signals, yielding the detected versions $$\tilde{b}_i^{(1)} = (\tilde{b}_{i,1}^{(1)}, \ldots, \tilde{b}_{i,N}^{(1)})^T \tag{6}$$

and $\tilde{b}_i^{(2)}$ of $b_i^{(1)}$ and $b_i^{(2)}$. Different detection techniques, for example the zero-forcing (ZF) based V-BLAST (see e.g. Tse, D.; Viswanath, P.: Fundamentals of wireless communications. New York: Cambridge University Press, 2005) or its minimum mean squared error (MMSE) counterpart SIC-MMSE may be used.

The symbol error probability of the ZF receiver (see e.g. Kiessling, M,; Speidel, J.; Analytical performance of MEMO zero-forcing receivers in correlated Rayleigh fading environments SPAWC 2003. pp. 383-387) is given by $$P_{e,ZF} = 1 - \left(\frac{\gamma_b}{1+\gamma_b}\right)^{1/4}, \tag{7}$$

with $\gamma_b$ being the average signal-to-noise radio (SNR) of a transmitted bit. In the case of the MMSE receiver (see e.g. Mario Kiessling, Joachim Speidel. Analytical performance of MIMO MMSE receivers in correlated Rayleigh fading environment. Vehicular Technology Conference, 2003. pp. 1738-1742) this yields $$P_{e,MMSE} = \tag{8}$$
$$1 - \sqrt{\left(\frac{1}{2\gamma_b}+1\right)\sqrt{\frac{\gamma_b}{1+\gamma_b}} - \frac{1}{2\gamma_b}\sqrt{\frac{\pi}{2}} e^{\left(\frac{1+\gamma_b}{2\gamma_b}\right)} \mathrm{erfc}\left(\sqrt{\frac{1+\gamma_b}{2\gamma_b}}\right)}.$$

MINEC Step Two. Relay Node Forwarding

The decode-and-forward (DF) forwarding scheme (see e.g. Ahlswede, R.; Cai, N.; Li, S.-Y. R.; Yeung, R. W.-H. (2000). Network information flow. IEEE Transactions on Information Theory, 46 (2000), pp. 1204-1216 or Fitzek, F. H. P.; Katz, M. D. (Eds,): Cooperation in wireless networks: Principles and applications. Berlin: Springer, 2006) is deployed in the second step of MINEC. The relay node R re-encodes and re-modulates the received signals (see equation (6)) and forwards them to the source nodes $S_1$ and $S_2$. In this second MINEC step, network coding and space-time block coding (STBC), like e.g. the Alamouti scheme (see Alamouti, S. M.: A simple transmit diversity technique for wireless communication. IEEE Journal on Select Areas in Communications, vol. 16 (1998), pp. 1451-1458), may be exploited together to obtain coding multiplexing and spatial diversity gain.

The network coding improves the network throughput, and the STBC overcomes channel fading, as will be explained now on the basis of a simple network coding scheme. $r_{i+2}^{(1)}(t)$ and $r_{i+2}^{(2)}(t)$ represent the signals transmitted over the first antenna $ANT_{R1}$ and the second antenna $ANT_{R2}$ of the relay node R, respectively, in the time slot (i+2). The network coding scheme is given by the bit-wise multiplication of the signals received in the i-th and the (i+1)-th time slots according to the following rule $$r_{i+2}^{(1)}(t) = \sum_{n=1}^{N} \tilde{b}_{i,n}^{(1)} \tilde{b}_{i,n}^{(2)} \cdot p(t-[n-1]T_b), \tag{9}$$

$$r_{i+2}^{(2)}(t) = \sum_{n=1}^{N} \tilde{b}_{i+1,n}^{(1)} \tilde{b}_{i+1,n}^{(2)} \cdot p(t-[n-1]T_b).$$

Setting out from equation (9), the transmitted information is given by $$d_{i+2,n}^{(1)} = \tilde{b}_{i,n}^{(1)} \tilde{b}_{i,n}^{(2)}, d_{i+2,n}^{(1)} \in \{-1,+1\}, n \in \{1, \ldots, N\},$$

$$d_{i+2,n}^{(2)} = \tilde{b}_{i+1,n}^{(1)} \tilde{b}_{i+1,n}^{(2)}, d_{i+2,n}^{(2)} \in \{-1,+1\}, n \in \{1, \ldots, N\}. \tag{10}$$

$r_{i+3}^{(1)}(t)$ and $r_{i+3}^{(2)}(t)$ are the transmit signals in the time slot (i+3) which correspond to $r_{i+2}^{(1)}(t)$ and $r_{i+2}^{(2)}(t)$.

After this network coding, the Alamouti scheme is applied: After transmitting $r_{i+2}^{(1)}(t)$ and $r_{i+2}^{(2)}(t)$ the time slot (i+2), the signal $$r_{i+3}^{(1)}(t) = -(r_{i+2}^{(2)}(t))^* = -r_{i+2}^{(2)}(t) \tag{11}$$

is transmitted by the first antenna $ANT_{R1}$ of the relay node R and the signal $$r_{i+3}^{(2)}(t) = (r_{i+2}^{(1)}(t))^* = r_{i+2}^{(1)}(t) \tag{12}$$

is transmitted by its second antenna $ANT_{R2}$ in the time slot (i+2). Using the notation already introduced by Alamouti, S. M.: A simple transmit diversity technique for wireless communication. WEE Journal on Select Areas in Communications, vol. 16 (1998), pp. 1451-1458, the signals $$\begin{pmatrix} e_{S,i+2}^{(1)}(t) \\ e_{S,i+3}^{(1)}(t) \end{pmatrix} = \begin{pmatrix} h_{i+2}^{(1,1)} & h_{i+2}^{(1,2)} \\ (h_{i+3}^{(1,2)})^* & -(h_{i+3}^{(1,1)})^* \end{pmatrix} \begin{pmatrix} r_{i+2}^{(1)}(t) \\ r_{i+2}^{(2)}(t) \end{pmatrix} + \begin{pmatrix} n_{i+2}^{(1)}(t) \\ n_{i+3}^{(1)}(t) \end{pmatrix} \tag{13}$$

and $$\begin{pmatrix} e_{S,i+2}^{(2)}(t) \\ e_{S,i+3}^{(2)}(t) \end{pmatrix} = \begin{pmatrix} h_{i+2}^{(2,1)} & h_{i+2}^{(2,2)} \\ (h_{i+3}^{(2,2)})^* & -(h_{i+3}^{(2,1)})^* \end{pmatrix} \begin{pmatrix} r_{i+2}^{(1)}(t) \\ r_{i+2}^{(2)}(t) \end{pmatrix} + \begin{pmatrix} n_{i+2}^{(2)}(t) \\ n_{i+3}^{(2)}(t) \end{pmatrix} \tag{14}$$

are received at the source nodes $S_1$ and $S_2$ in the time slots (i+2) and (i+3). The source nodes $S_1$ and $S_2$ detect $\hat{d}_{i+2,n}$, $n \in \{1, \ldots, N\}$, and $\hat{d}_{i+3,n}$, $n \in \{1 \ldots, N\}$, each by combining the two successive incoming signals with corresponding channel information, and estimating the combined signal using the maximum likelihood (ML) decision rule (see e.g. Alamouti, S. M.: A simple transmit diversity technique for wireless communication. IEEE Journal on Select Areas in Communications, vol. 16 (1998), pp. 1451-1458). The corresponding bit error probability of this 2×1 MISO system (see e.g. Zhang, H.; Gulliver, T. A.: Capacity and error probability analysis for orthogonal space-time block codes over fading channels. IEEE Transactions on Wireless Communication, vol. 4 (2005), pp. pp. 808-819), is given by $$P_{e,Alam.} = \frac{1}{2}\left(1 - \frac{1}{2}\sqrt{\frac{\gamma_b}{2+\gamma_b}}\left(3 - \frac{\gamma_b}{2+\gamma_b}\right)\right). \tag{15}$$

After the detection which yields $\hat{d}_{i+2,n}$, $n \in \{1, \ldots, N\}$, and $\hat{d}_{i+3,n}$, $n \in \{1, \ldots, N\}$ at the source nodes, each source node is able to determine the particular information that originated from the other source node. The first source node $S_1$ computes $$\begin{pmatrix} \hat{b}^{(1)}_{i+2,n} \\ \hat{b}^{(1)}_{i+3,n} \end{pmatrix} = \begin{pmatrix} \hat{d}_{i+2,n} \cdot b^{(1)}_{i,n} \\ \hat{d}_{i+3,n} \cdot b^{(1)}_{i+1,n} \end{pmatrix}, n \in \{1, \ldots, N\}, \tag{16}$$

and the second source node $S_2$ evaluates $$\begin{pmatrix} \hat{b}^{(2)}_{i+2,n} \\ \hat{b}^{(2)}_{i+3,n} \end{pmatrix} = \begin{pmatrix} \hat{d}_{i+2,n} \cdot b^{(2)}_{i,n} \\ \hat{d}_{i+3,n} \cdot b^{(2)}_{i+1,n} \end{pmatrix}, n \in \{1, \ldots, N\}. \tag{17}$$

In the MINEC protocol, four time slots are used for transmitting the two information sequences $b_i^{(1)}$ and $b_{i+1}^{(1)}$ from the first source node $S_1$ to the second source node $S_2$. In the same four time slots, the second source $S_2$ transfers its information sequences $b_i^{(2)}$ and $b_{i+1}^{(2)}$ to the first source node $S_1$. Hence, the efficiency is still one information sequence per time slot, only the latency is four time slots.

Figure 3:
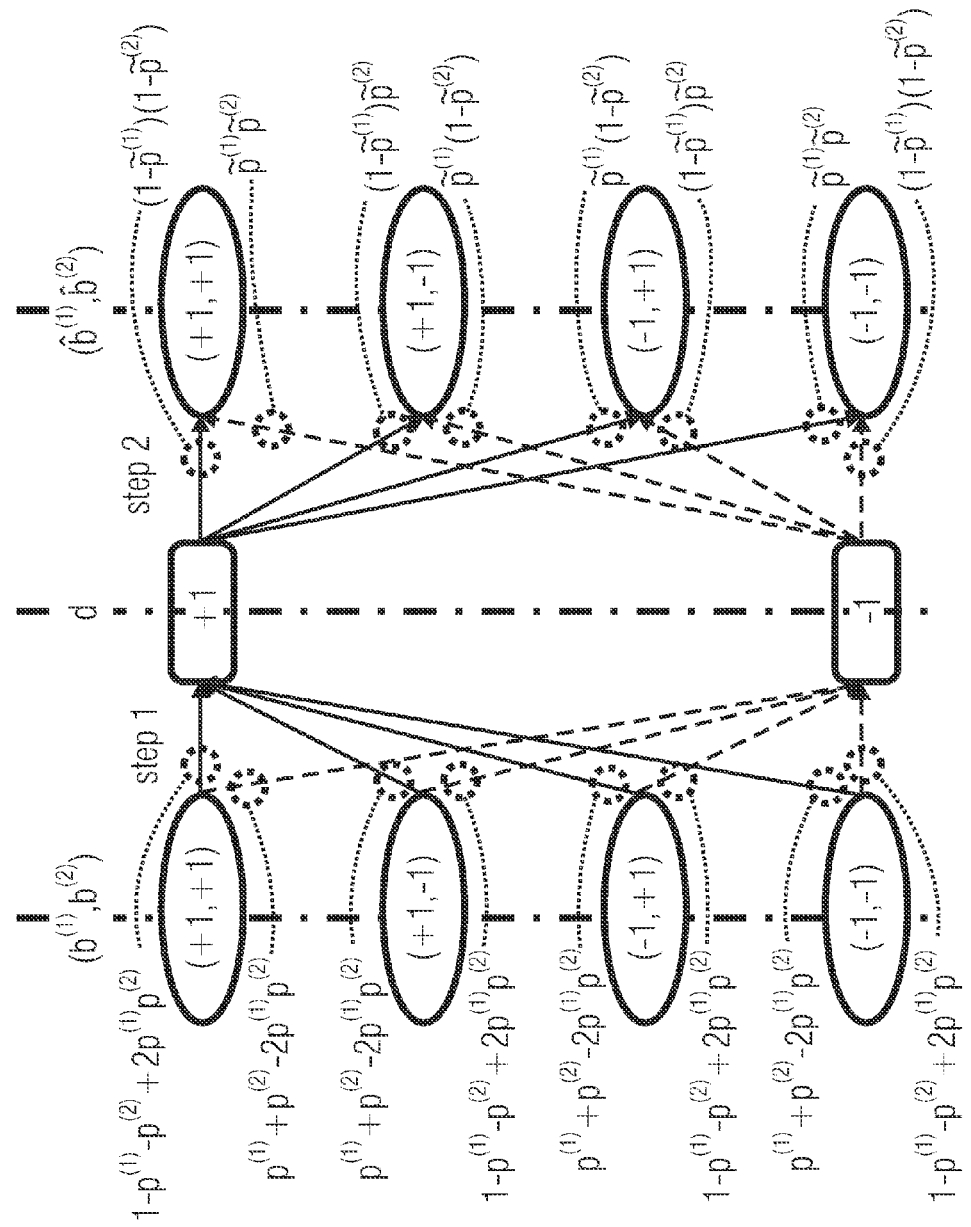
FIG. 3 shows a memoryless binary symmetric relay network channel in the three nodes relay network of FIG. 1.

In the following the capacity gains are evaluated that are achieved by the inventive approach. For this evaluation of the capacity gain of the MINEC approach, a memoryless binary symmetric relay network channel (BSRNC) model as shown in FIG. 3 will be used. The transmission of the two source nodes $S_1$ and $S_2$ is considered to be perfectly synchronized and consecutive bits are considered to be statistically independent of each other. In this case, it is sufficient to consider the transmission of single binary messages by each node.

At the beginning of the first MINEC step, the two source nodes $S_1$ and $S_2$ do not know about each other. Therefore, the input to the BSRNC consists of two bits, $(b^{(1)}, b^{(2)})$, having four possible realizations, $(-1,-1)$, $(-1,+1)$, $(+1,-1)$ and $(+1,+1)$. With $0 \leq \alpha, \beta \leq 1$, the following occurrence probabilities of the source pair are assumed, $$Pr\{(b^{(1)}, b^{(2)}) = (-1,-1)\} = \alpha\beta, \tag{18}$$

$$Pr\{(b^{(1)}, b^{(2)}) = (+1,+1)\} = (1-\alpha)(1-\beta), \tag{19}$$

$$Pr\{(b^{(1)} \cdot b^{(2)} = -1)\} = \alpha(1-\beta) + (1-\alpha)\beta. \tag{20}$$

The transmission over the BSRNC is characterized by using error probabilities. $p^{(1)}$ is the probability of an error associated with the link between the source node $S_1$ and the relay node R that the transmitted bit $b^{(1)}$ is received correctly. Consequently, the correct reception occurs with a probability $(1-p^{(1)})$. Similarly, $p^{(2)}$ and $(1-p^{(2)})$ denote the probability of an erroneous and error-free transmission between the source node $S_2$ and the relay node R for bit $b^{(2)}$, respectively. The error probabilities $p^{(1)}$ and $p^{(2)}$ reflect the spatial multiplexing reception at the relay node B which are represented by equations (7) or (8) when the channel state information is perfectly known at the relay node R.

When considering the BSRNC of FIG. 3 the reception probabilities at the source nodes $S_1$ and $S_2$ in the second MINEC step are independent of each other. It is now assumed that the transmission from the relay node R to the source nodes $S_1$ and $S_2$ are erroneous with probabilities $\tilde{p}^{(1)}$ and $\tilde{p}^{(2)}$, respectively. The error probabilities $\tilde{p}^{(1)}$ and $\tilde{p}^{(2)}$ at the source nodes $S_1$ and $S_2$ represent the STBC (Alamouti) reception with $P_{e,Alam.}$ of equation (15). After the reception, the following probabilities for the source node $S_1$ exist:

$$Pr\{\hat{b}^{(1)} = +1\} = [1 - \alpha - \beta + 2\alpha\beta] \cdot \tag{21}$$
$$(1 - \tilde{p}^{(1)}) \cdot [1 - p^{(1)} - p^{(2)} + 2p^{(1)}p^{(2)}] +$$
$$[1 - \alpha - \beta + 2\alpha\beta] \cdot \tilde{p}^{(1)} \cdot [p^{(1)} + p^{(2)} - 2p^{(1)}p^{(2)}] +$$
$$[\alpha + \beta - 2\alpha\beta] \cdot (1 - \tilde{p}^{(1)}) \cdot [p^{(1)} + p^{(2)} - 2p^{(1)}p^{(2)}] +$$
$$[\alpha + \beta - 2\alpha\beta] \cdot \tilde{p}^{(1)} \cdot [1 - p^{(1)} - p^{(2)} + 2p^{(1)}p^{(2)}],$$

$$Pr\{\hat{b}^{(1)} = -1\} = [1 - \alpha - \beta + 2\alpha\beta] \cdot \tilde{p}^{(1)} \cdot \tag{22}$$
$$[1 - p^{(1)} - p^{(2)} + 2p^{(1)}p^{(2)}] + [1 - \alpha - \beta + 2\alpha\beta] \cdot$$
$$(1 - \tilde{p}^{(1)}) \cdot [p^{(1)} + p^{(2)} - 2p^{(1)}p^{(2)}] + [\alpha + \beta - 2\alpha\beta] \cdot$$
$$\tilde{p}^{(1)} \cdot [p^{(1)} + p^{(2)} - 2p^{(1)}p^{(2)}] + [\alpha + \beta - 2\alpha\beta] \cdot$$
$$(1 - \tilde{p}^{(1)}) \cdot [1 - p^{(1)} - p^{(2)} + 2p^{(1)}p^{(2)}].$$

Similar probabilities for source node $S_2$ also exist and are not repeated.

Without loss of generality, the input bits pair $(b^{(1)}, b^{(2)})$ and the output bits pair $(\hat{b}^{(1)}, \hat{b}^{(2)})$ form the vectors $$b = (b^{(1)}, b^{(2)}), \hat{b} = (\hat{b}^{(1)}, \hat{b}^{(2)}). \tag{23}$$

Let $$B = \{(-1,-1); (-1,+1); (+1,-1); (+1,+1)\} \tag{24}$$

be the set of all bits pair realizations. It is now assumed that the receivers know the channel state information perfectly, but the transmitters do not. With equations (18-(22), the mutual information (see e.g. Van der Lubbe, J. C. A.: Information theory. New York: Cambridge University Press, 1997) between b and $\hat{b}$ in equation (23) is given by $$I(b; \hat{b}) = \tag{25}$$
$$-\sum_{\hat{b} \in B} Pr\{\hat{b}\} \cdot \log_2(Pr\{\hat{b}\}) + \sum_{b \in B} Pr\{b\} \sum_{\hat{b} \in B} Pr\{\hat{b}|b\} \cdot \log_2(Pr\{\hat{b}|b\}).$$

In equation (25), $Pr\{\hat{b}\}$ is the probability of the occurrence of the output bits pair $\hat{b}$, and $Pr\{\hat{b}|b\}$ is the probability of the observation of $\hat{b}$, given b. Using $$X_1 = \tag{26}$$
$$\tilde{p}^{(1)} + p^{(1)} + p^{(2)} - 2p^{(1)}p^{(2)} - 2\tilde{p}^{(1)}p^{(1)} - 2\tilde{p}^{(1)}p^{(2)} + 4\tilde{p}^{(1)}p^{(1)}p^{(2)},$$

$$X_2 = \tag{27}$$
$$\tilde{p}^{(2)} + p^{(1)} + p^{(2)} - 2p^{(1)}p^{(2)} - 2\tilde{p}^{(2)}p^{(1)} - 2\tilde{p}^{(2)}p^{(2)} + 4\tilde{p}^{(2)}p^{(1)}p^{(2)},$$

And

-continued $$Y_1 = \alpha + \beta - 2\alpha\beta + X_1 - 2\alpha X_1 - 2\beta X_1 + 4\alpha\beta X_1, \quad (28)$$

$$Y_2 = \alpha + \beta - 2\alpha\beta + X_2 - 2\alpha X_2 - 2\beta X_2 + 4\alpha\beta X_2, \quad (29)$$

equation (25) yields $$I(b;\hat{b}) = -\begin{bmatrix} (1-Y_1)\log_2(1-Y_1) + Y_1\log_2 Y_1 + \\ (1-Y_2)\log_2(1-Y_2) + Y_2\log_2 Y_2 \end{bmatrix} + \begin{bmatrix} (1-X_1)\log_2(1-X_1) + X_1\log_2 X_1 + \\ (1-X_2)\log_2(1-X_2) + X_2\log_2 X_2 \end{bmatrix}. \quad (30)$$

It is assumed that $p^{(1)}$ and $p^{(2)}$ are equal, represented by $p$ and that $\tilde{p}^{(1)}$ and $\tilde{p}^{(2)}$ are equal, represented by $\tilde{p}$. Furthermore, assuming the a-prior probabilities $\alpha$ and $\beta$ to be equal, taking the value ½, the equation (30) will yield the maximum of the BSRNC capacity. Using $$P = 2[p - p^2 - 2p\tilde{p} + 2p^2\tilde{p}] + \tilde{p} \quad (31)$$

and taking into account that four time slots are used for completing the MINEC protocol, the capacity of the BSRNC yields $$C = 1 + P\log_2 P + (1-P)\log_2(1-P). \quad (32)$$

In the following the performance of the traditional relay network scheme (see e.g. Kati, S.; Gollakota, S.; Katabi, D.: Embracing wireless interference: Analog network coding. Proceedings of the Special Interest Group on Data Communication Conference (SIGCOMM'07), Aug. 27-31, 2007, Kyoto, Japan, pp. 397-408), of the network coding relay scheme (see e.g. Shengli Fu; Kejie Lu; Yi Qian; Varanasi, M.: Cooperative network coding for wireless ad-hoc networks. Proceedings of the IEEE GLOBECOM 2007, pp. 812-816) and of the physical layer network coding (PNC) (see e.g. Zhang, S.; Liew, S.; Lam, P.: Hot topic: Physical layer network coding. In Proceedings of the 12th Annual International Conference on Mobile Computing and Networking (Mobi-Com'06), 2006, pp. 358-365) is compared to the inventive MINEC approach. All schemes use BPSK. As already mentioned above, the i.i.d Rayleigh-flat-fading channel model is assumed between each antenna pair in the system.

Figure 4:
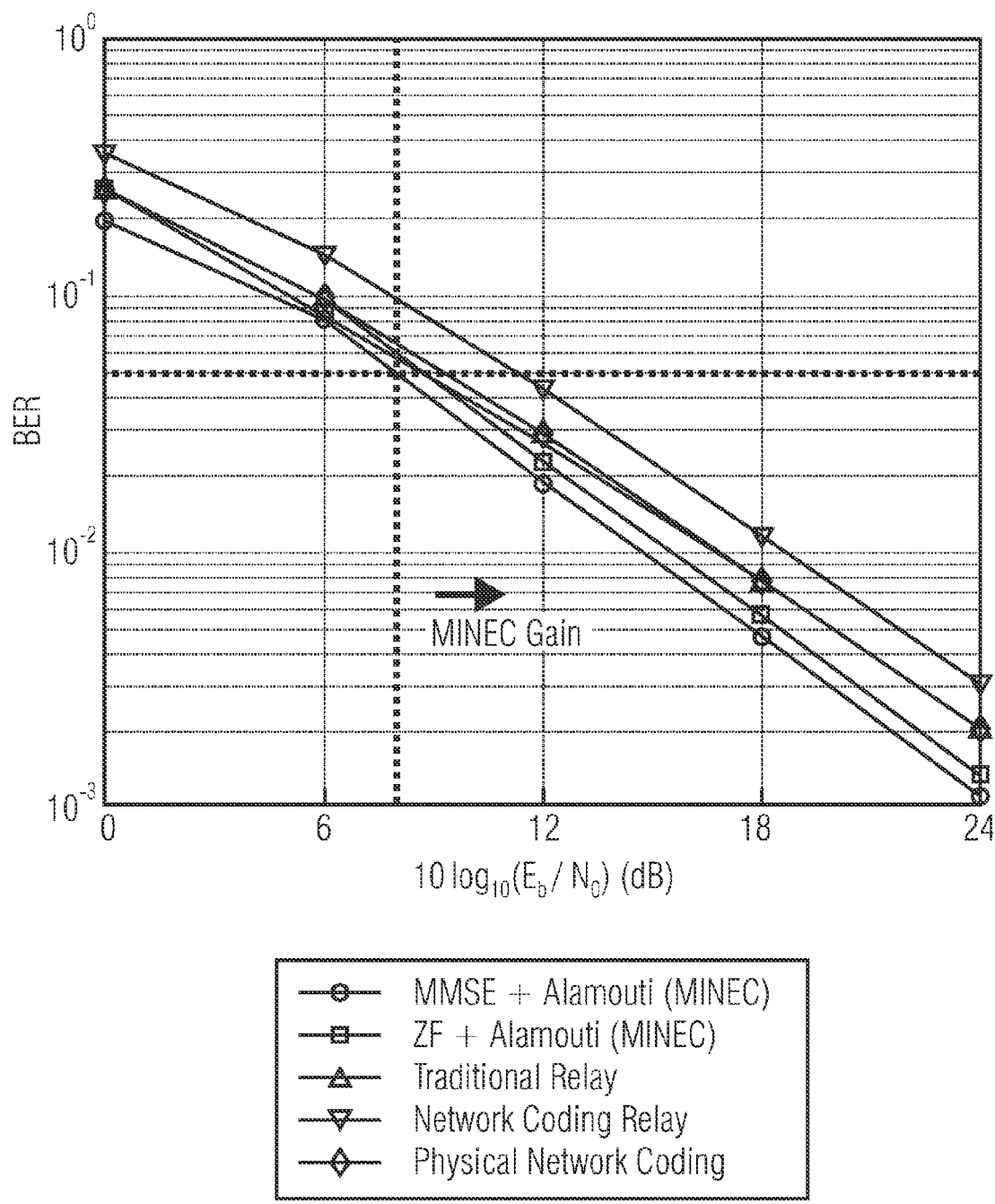
FIG. 4 shows a graph illustrating a comparison of the overall bit error performance obtained in the three nodes relay network of FIG. 1.

FIG. 4 provides a comparison of the overall bit error performance obtained in the three nodes relay network. In the first step of the MINEC scheme, two different spatial multiplexing receivers, ZF and MMSE are deployed at the relay node R. In the second step of MINEC scheme, the source node $S_1$ or $S_2$ applies an Alamouti Maximum Likelihood (ML) symbol detector followed by a binary exclusive OR operation to extract BPSK signals from the other. At desirably low bit error ratio values below approx. $5\times10^{-2}$ (5%), the MINEC scheme outperforms the traditional relay network scheme, the network coding relay scheme and the PNC.

Figure 5:
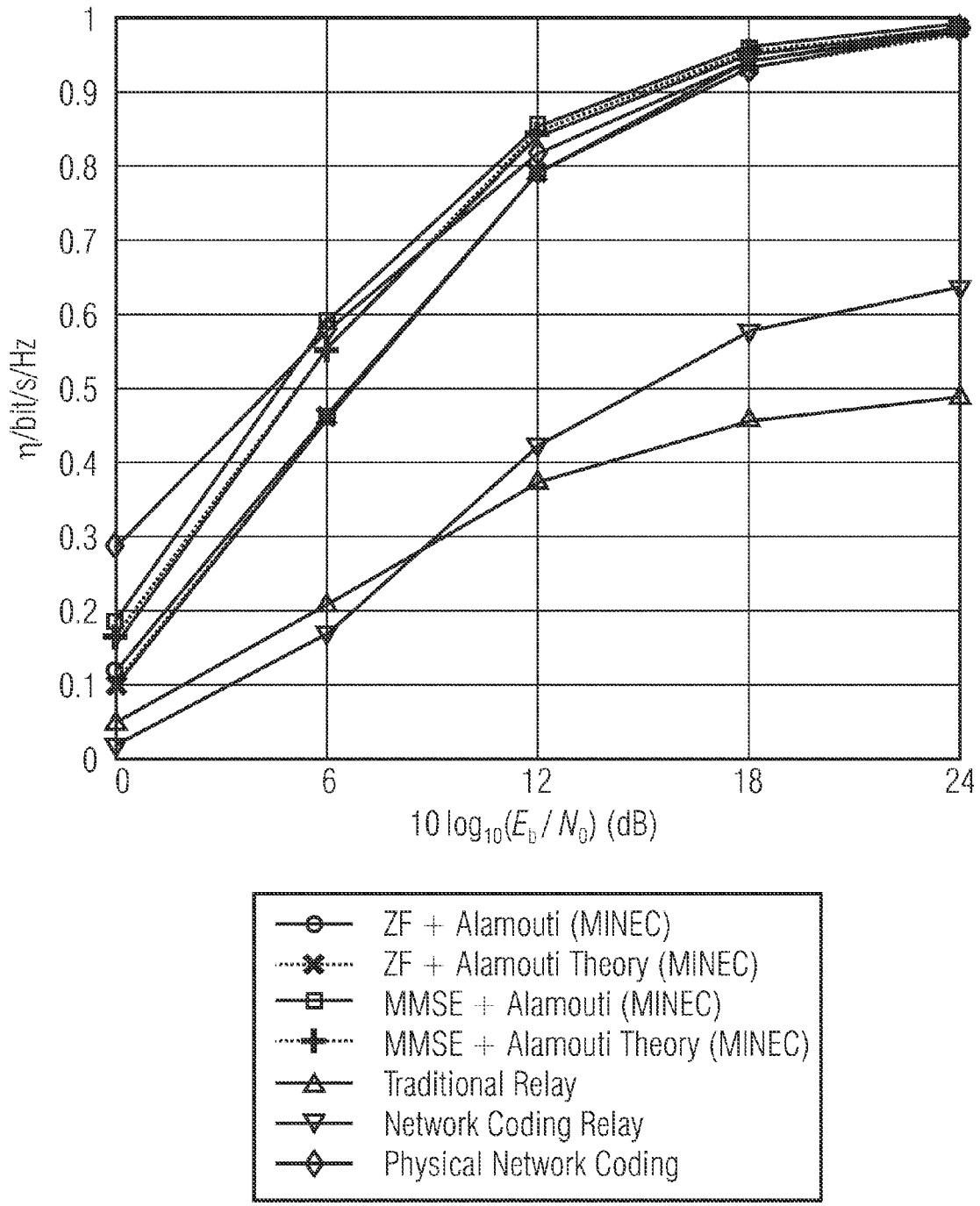
FIG. 5 shows a graph illustrating the channel capacity as a function of the SNR in the three nodes relay network of FIG. 1.

FIG. 5 illustrates the obtained channel capacity as a function of the SNR assuming that the SNR values in both MINEC steps are identical. The theoretical analysis results of equation (30) with corresponding receivers in both MINEC steps are also plotted which are aligned with Monte-Carlo simulation results of the channel capacity with MINEC scheme. In FIG. 5 the proposed MINEC scheme and the PNC (see e.g. Zhang, S.; Liew, S.; Lam, P.: Hot topic: Physical layer network coding. In Proceedings of the 12th Annual International Conference on Mobile Computing and Networking (MobiCom'06), 2006, pp. 358-365) provide higher throughput than the traditional relay network scheme (see e.g. Kati, S.; Gollakota, S.; Katabi, D.: Embracing wireless interference: Analog network coding. Proceedings of the Special Interest Group on Data Communication Conference (SIGCOMM'07), Aug. 27-31, 2007, Kyoto, Japan, pp. 397-408) and of the network coding relay scheme (see e.g. Shengli Fu; Kejie Lu; Yi Qian; Varanasi, M.: Cooperative network coding for wireless ad-hoc networks. Proceedings of the IEEE GLOBECOM 2007, pp. 812-816). Although the PNC has a slight advantage at low SNR values, the MINEC is more tailored to achieve a high throughput at moderate and high SNR values. In summary, the proposed MINEC outperforms the competing schemes.

The above evaluation (in terms of performance analysis and the comparison with well-known systems) of the inventive approach, the new combination of MIMO and network coding, termed MINEC shows the advantages of MINEC over traditional schemes. The benefits of MINEC come from the deployment of multi-antennas $ANT_{R1}$ and $ANT_{R2}$ at the relay node R. In MINEC, both the advantages of code multiplexing and spatial diversity gains are combined.

Although some aspects have been described in the context of an apparatus, it is clear that these aspects also represent a description of the corresponding method, where a block or device corresponds to a method step or a feature of a method step. Analogously, aspects described in the context of a method step also represent a description of a corresponding block or item or feature of a corresponding apparatus.

Depending on certain implementation requirements, embodiments of the invention can be implemented in hardware or in software. The implementation can be performed using a digital storage medium, for example a floppy disk, a DVD, a CD, a ROM, a PROM, an EPROM, an EEPROM or a FLASH memory, having electronically readable control signals stored thereon, which cooperate (or are capable of cooperating) with a programmable computer system such that the respective method is performed.

Some embodiments according to the invention comprise a data carrier having electronically readable control signals, which are capable of cooperating with a programmable computer system, such that one of the methods described herein is performed.

Generally, embodiments of the invention can be implemented as a computer program product with a program code, the program code being operative for performing one of the methods when the computer program product runs on a computer. The program code may for example be stored on a machine readable carrier. Other embodiments comprise the computer program for performing one of the methods described herein, stored on a machine readable carrier.

In other words, an embodiment of the inventive method may, therefore, be
   a computer program having a program code for performing one of the methods described herein, when the computer program runs on a computer, or
   a data carrier (or a digital storage medium, or a computer-readable medium) comprising, recorded thereon, the computer program for performing one of the methods described herein, or
   a data stream or a sequence of signals representing the computer program for performing one of the methods described herein. The data stream or the sequence of signals may for example be configured to be transferred via a data communication connection, for example via the Internet.

A further embodiment comprises a processing means, for example a computer, or a programmable logic device, configured to or adapted to perform one of the methods described herein. A further embodiment comprises a computer having installed thereon the computer program for performing one of the methods described herein.

In some embodiments, a programmable logic device (for example a field programmable gate array) may be used to perform some or all of the functionalities of the methods described herein. In some embodiments, a field programmable gate array may cooperate with a microprocessor in order to perform one of the methods described herein. Generally, the methods are advantageously performed by any hardware apparatus.

While this invention has been described in terms of several embodiments, there are alterations, permutations, and equivalents which fall within the scope of this invention. It should also be noted that there are many alternative ways of implementing the methods and compositions of the present invention. It is therefore intended that the following appended claims be interpreted as including all such alterations, permutations and equivalents as fall within the true spirit and scope of the present invention.

The invention claimed is:

1. A method for relaying signals between a first signal source and a second signal source by a relay station that comprises at least two antennas for receiving/transmitting signals from/to the first and second signal sources, the method comprising:
   in a first time slot, receiving at the relay station a first signal from the first signal source and a first signal from the second signal source;
   in a second time slot, receiving at the relay station a second signal from the first signal source and a second signal from the second signal source;
   at the relay station, generating a first network coded signal by network coding the first signals received from the first and second signal sources in the first time slot, and generating a second network coded signal by network coding the second signals received from the first and second signal sources in the second time slot;
   in a third time slot, transmitting the first network coded signal by a first antenna of the relay station, and transmitting the second network coded signal by a second antenna of the relay station; and
   in a fourth time slot, transmitting the first network coded signal by the second antenna of the relay server, and transmitting the second network coded signal by the first antenna of the relay server
   wherein, the first time slot, the second time slot, the third and the fourth time slot are each consecutive time slots.

2. The method of claim 1, further comprising: at each of the first and second signal sources, determining the first and the second signals that originated from the other of the first and second signal sources on the basis of the first and second network coded signals and on the basis of the first and second signals.

3. The method of claim 2, wherein said determining comprises:
   at the first signal source, acquiring the first and second signal that originated from the second signal source on the basis of the first and second network coded signals and the first and second signals of the first signal source; and
   at the second signal source, acquiring the first and second signals that originated from the first signal source on the basis of the first and second network encoded signals and the first and second signals of the second signal source.

4. A non-transitory computer readable medium comprising a plurality of instructions for carrying out a method of claim 1, wherein executing the instructions by a computer.

5. A relay station for relaying signals between a first signal source and a second signal source, comprising:
   at least two antennas for receiving/transmitting signals; and
   a processor is configured to cause network coding of signals received, the relay station being configured to cause:
   in a first time slot, receiving at the relay station a first signal from the first signal source and a first signal from the second signal source;
   in a second time slot, receiving at the relay station a second signal from the first signal source and a second signal from the second signal source;
   at the relay station, generating a first network coded signal by network coding the first signals received from the first and second signal sources in the first time slot, and generating a second network coded signal by network coding the second signals received from the first and second signal sources in the second time slot;
   in a third time slot, transmitting the first network coded signal by a first antenna of the relay station, and transmitting the second network coded signal by a second antenna of the relay station; and
   in a fourth time slot, transmitting the first network coded signal by the second antenna of the relay server, and transmitting the second network coded signal by the first antenna of the relay server,
   wherein, the first time slot, the second time slot, the third and the fourth time slot are each consecutive time slots.

6. A system, comprising:
   a first signal source;
   a second signal source; and
   a relay station for relaying signals between the first signal source and the second signal source, comprising:
   at least two antennas for receiving/transmitting signals; and
   a processor is configured to cause network coding of signals received,
   the relay station being configured to cause:
   in a first time slot, receiving at the relay station a first signal from the first signal source and a second signal from the second signal source;
   in a second time slot, receiving at the relay station a third signal from the first signal source and a fourth signal from the second signal source;
   at the relay station, generating a first network coded signal by network coding the first and second signals received from the first and second signal sources in the first time slot, and generating a second network coded signal by network coding the third and fourth signals received from the first and second signal sources in the second time slot;
   in a third time slot, transmitting the first network coded signal by a first antenna of the relay station, and transmitting the second network coded signal by a second antenna of the relay station; and
   in a fourth time slot, transmitting the first network coded signal by the second antenna of the relay server, and transmitting the second network coded signal by the first antenna of the relay server, wherein, the first time slot, the second time slot, the third and the fourth time slot are each consecutive time slots, the respective signal sources are configured to cause transmitting from the first signal source consecutively the first signal and the third signal, and from the second signal source consecutively the second signal and the fourth signal, the first signal source is configured to acquire the second and fourth signal that originated from the second source on the basis of the first and second network coded signals and the first and third signals of the first signal source, and the second signal source is configured to acquire the first and third signals that originated from the first signal source on the basis of the first and second network coded signals and the second and fourth signals of the second signal source.

* * * * *